(12) United States Patent
Nakao et al.

(10) Patent No.: US 7,394,049 B2
(45) Date of Patent: Jul. 1, 2008

(54) OPTICAL DISK APPARATUS AND PICKUP UNIT

(75) Inventors: Takashi Nakao, Tokyo (JP); Shinichi Kai, Tokyo (JP); Isao Ichimura, Tokyo (JP)

(73) Assignee: Sony Corporation, Tokyo (JP)

( * ) Notice: Subject to any disclaimer, the term of this patent is extended or adjusted under 35 U.S.C. 154(b) by 205 days.

(21) Appl. No.: 11/447,110

(22) Filed: Jun. 6, 2006

(65) Prior Publication Data
US 2006/0278807 A1    Dec. 14, 2006

(30) Foreign Application Priority Data
Jun. 9, 2005    (JP)    ............................. 2005-169094

(51) Int. Cl.
*G11B 7/00*    (2006.01)
(52) U.S. Cl. ............... 250/201.5; 369/44.41; 369/53.23
(58) Field of Classification Search .............. 250/201.2, 250/201.4, 201.5, 214 R, 234; 369/44.13, 369/44.23, 44.28, 44.29, 44.41, 53.22–53.23, 369/120
See application file for complete search history.

(56) References Cited

U.S. PATENT DOCUMENTS 5,671,199 A * 9/1997 Nishikawa ................ 369/44.26
6,828,537 B2 * 12/2004 Jutte ........................ 250/201.2

* cited by examiner

*Primary Examiner*—Kevin Pyo
(74) *Attorney, Agent, or Firm*—Oblon, Spivak, McClelland, Maier & Neustadt, P.C.

(57) ABSTRACT

An optical disk apparatus includes a light emitting unit, a light detecting unit, a tracking error signal generating unit, and a tracking control unit. The light emitting unit emits a single light beam onto an optical disk. The light detecting unit includes at least three light detecting portions, each being configured to receive light reflected off the optical disk and produce corresponding output. The at least three light detecting portions are arranged in a track direction of the optical disk. The tracking error signal generating unit generates at least two types of the tracking error signal using the outputs from the at least three light detecting portions. The tracking control unit performs tracking control on the optical disk on the basis of the tracking error signal.

17 Claims, 10 Drawing Sheets

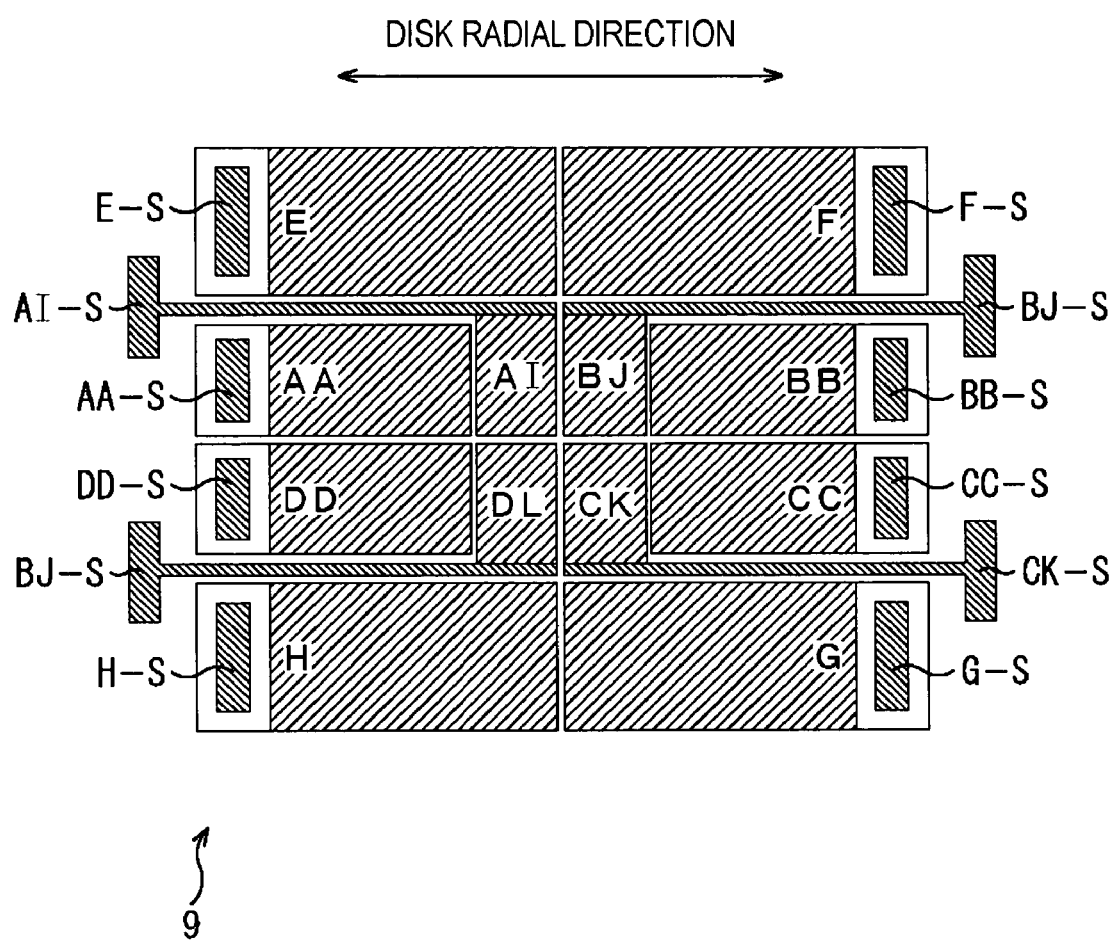

OPTICAL DISK APPARATUS AND PICKUP UNIT

CROSS REFERENCES TO RELATED APPLICATIONS

The present invention contains subject matter related to Japanese Patent Application JP 2005-169094 filed in the Japanese Patent Office on Jun. 9, 2005, the entire contents of which are incorporated herein by reference.

BACKGROUND OF THE INVENTION

1. Field of the Invention

The present invention relates to an optical disk apparatus and a pickup unit and, in particular, to an optical disk apparatus and a pickup unit capable of supporting an optical disk including a plurality of signal layers.

2. Description of the Related Art

In recent years, the use of optical disk apparatuses has become widespread (refer to, for example, Japanese Patent No. 3438160 and Japanese Unexamined Patent Application Publication No. 2004-281026).

To detect a tracking error in an optical disk apparatus, Japanese Patent No. 3438160, for example, describes a one spot push-pull method. The one spot push-pull method is simple and has an advantage over a three-beam method in that the utilization efficiency of a laser beam is high. Therefore, the one spot push-pull method is suitable for recordable optical disk apparatuses.

SUMMARY OF THE INVENTION

However, as described in Japanese Patent No. 3438160, a known light receiving element utilizing the one spot push-pull method cannot detect a differential phase detection (DPD) signal used as a tracking error signal of, for example, reproduction-only digital versatile disks (DVDs).

Additionally, to receive a variety of servo signals, the light receiving element needs to have a plurality of separate light detecting portions. Therefore, in order to prevent the deterioration of a reproduction signal caused by the summation of signals from the plurality of separate light detecting portions, a beam needs to be separated into a plurality of sub beams for servo detection and reproduction signal detection. In addition, additional light receiving elements for reproduction signal detection are needed. That is, a method for using a plurality of sub beams is needed in place of the one spot push-pull method.

The method using a plurality of sub beams is effective for optical disks including a single signal layer. However, this method is considered not to be effective for optical disks including a plurality of signal layers, such as DVDs and BDs (Blu-ray Disc®). This is because the optical disk including a plurality of signal layers is affected by unwanted reflected light caused by reflection from a signal layer different from the target signal layer (i.e., interlayer stray light). Accordingly, in an optical disk apparatus using a method of controlling a plurality of sub beams, a servo error signal and a reproduction signal may deteriorate.

Accordingly, for example, Japanese Unexamined Patent Application Publication No. 2004-281026 describes a method for supporting an optical disk including two signal layers. In this method, servo detection areas are arranged so that the interlayer stray light is avoided. Unfortunately, even this method could not support an optical disk including three signal layers or more.

That is, under present circumstances, it is very difficult to provide an optical disk apparatus (or a pickup unit of the optical disk apparatus) of the one spot push-pull method that can detect a DPD signal and that can support an optical disk including a plurality of signal layers.

According to an embodiment of the present invention, there is provided an optical disk apparatus (and a pickup unit of the optical disk apparatus) utilizing the one spot push-pull method that can detect a DPD signal and that can support an optical disk including a plurality of signal layers.

According to an embodiment of the present invention, there is provided an optical disk apparatus. The optical disk apparatus includes a light emitting unit, a light detecting unit, a tracking error signal generating unit, and a tracking control unit. The light emitting unit emits a single light beam onto an optical disk. The light detecting unit includes at least three light detecting portions, each being configured to receive light reflected off the optical disk and produce corresponding output. The at least three light detecting portions are arranged in a track direction of the optical disk. The tracking error signal generating unit generates at least two types of the tracking error signal using the outputs from the at least three light detecting portions, and the tracking control unit performs tracking control on the optical disk on the basis of the tracking error signal.

According to another embodiment of the present invention, there is provided an optical pickup unit for use in an optical disk apparatus. The optical pickup unit includes a light emitting unit, a light detecting unit, and an output unit. The light emitting unit emits a single light beam onto an optical disk. The light detecting unit includes at least three light detecting portions, each being configured to receive light reflected off the optical disk and produce corresponding output. The at least three light detecting portions are arranged in a track direction of the optical disk, and the output unit outputs a signal from the at least three light detecting portions for generating at least two types of the tracking error.

BRIEF DESCRIPTION OF THE DRAWINGS

FIG. 10 illustrates a light receiving surface of the light detecting unit according to an embodiment of the present invention, which is different from the light receiving surfaces shown in FIGS. 2, 6, and 9.

DESCRIPTION OF THE PREFERRED EMBODIMENTS

Figure 1:
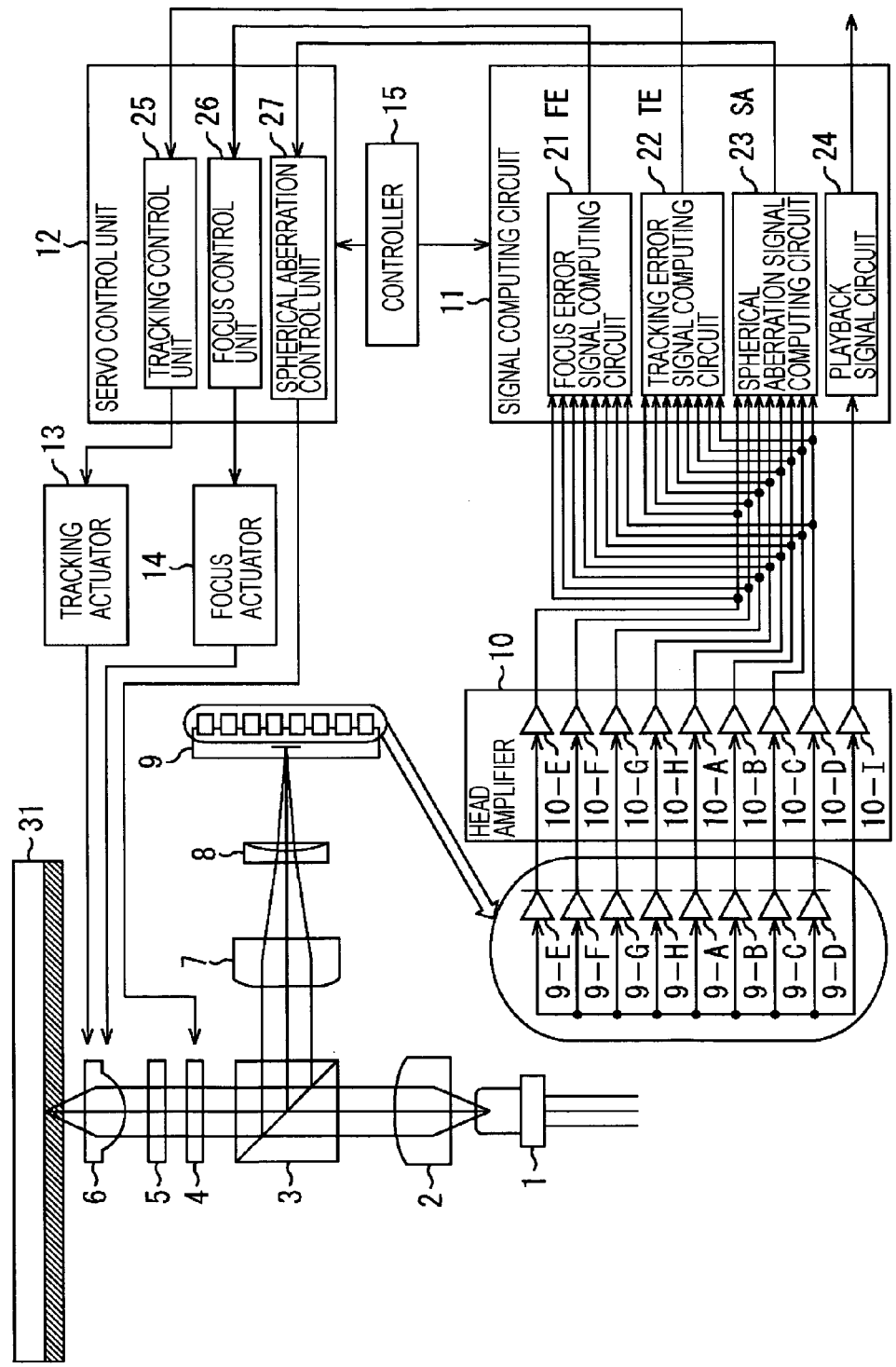
FIG. 1 is a block diagram of an optical disk apparatus according to an embodiment of the present invention or an optical disk apparatus including a light detecting unit according to an embodiment of the present invention.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

According to an embodiment of the present invention, there is provided an optical disk apparatus. The optical disk apparatus (e.g., an optical disk apparatus shown in FIG. 1) performs at least one of a recording operation and a reproduction operation of an information signal on and from an optical disk (e.g., an optical disk 31 shown in FIG. 1). The information signal is recorded or is to be recorded on the optical disk in a predetermined track format. The optical disk apparatus includes light collecting means for collecting light beams on a recording surface of the optical disk (e.g., an objective lens 6 shown in FIG. 1), first moving means for moving the light collecting means in a direction perpendicular to the track direction of the optical disk (e.g., a tracking actuator 13 shown in FIG. 1), light detecting means (e.g., a light detecting unit 9 shown in FIG. 1) including a light receiving element (e.g., a light receiving element (light receiving surface) shown in FIG. 2 or 6) for receiving a light beam reflected off the optical disk, first tracking error signal generating means (e.g., a tracking error computing unit 62 of FIG. 5 in a tracking error signal computing circuit 22 shown in FIG. 1), a beam-spot offset computing means (e.g., a beam-spot offset computing unit 61 of FIG. 5 in the tracking error signal computing circuit 22 shown in FIG. 1), an offset correcting means (e.g., an offset correction computing unit 64 of FIG. 5 in the tracking error signal computing circuit 22 shown in FIG. 1), and tracking control means (e.g., a tracking control unit 25 shown in FIG. 1). The surface of the light receiving element is divided into the following three areas in the direction perpendicular to the track direction of the optical disk: a first track-direction end area at one end, a second track-direction end area at the other end, and a track-direction middle area at the middle (e.g., areas shown in FIG. 2 or 6). The track-direction middle area is further divided into at least two in the direction perpendicular to the track direction. Furthermore, the light receiving element is divided into two in a direction parallel to the track direction. As a result, two light detecting portions are formed in the first track-direction end area (e.g., light detecting portions E and F shown in FIG. 2 or 6). Two light detecting portions are formed in the second track-direction end area (e.g., light detecting portions H and G shown in FIG. 2 or 6). Additionally, at least four light detecting portions are formed in the track-direction middle area (e.g., light detecting portions A to D shown in FIG. 2 or light detecting portions AA, BB, CC, DD, AI, BJ, CK, and DL shown in FIG. 6). The first tracking error signal generating means performs predetermined computation using the outputs from at least the four light detecting portions formed in the track-direction middle area (e.g., computation of $\{(a+d)-(b+c)\}$ in equation (3) or (10)) so as to generate a tracking error signal representing a relative offset between the track and the light beam. The beam-spot offset computing means performs predetermined computation using the outputs from the two light detecting portions formed in the first track-direction end area and the two light detecting portions formed in the second track-direction end area (e.g., computation of $\{(e+h)-(f+g)\}$ in equation (3) or (10)) so as to detect a relative offset of the beam spot on the light receiving element of the light detecting unit. The offset correcting means corrects the tracking error signal generated by the first tracking error signal generating means on the basis of the relative offset of the beam spot detected by the beam-spot offset computing means (e.g., correction by computing equation (3) or (10)). The tracking control means performs tracking control by moving the first moving means in accordance with the tracking error signal corrected by the offset correcting means.

Figure 5:
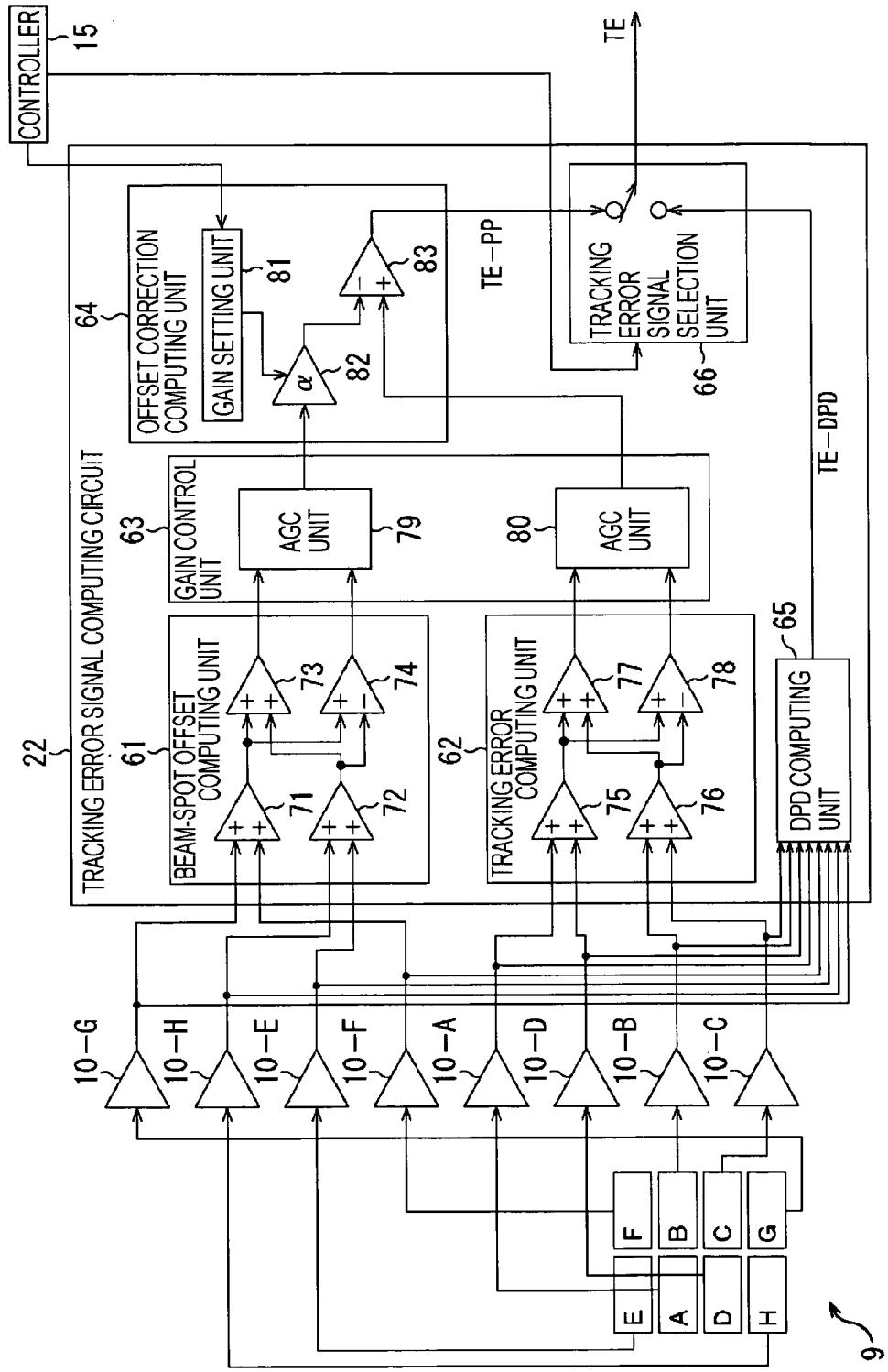
FIG. 5 is a block diagram of the configuration of a tracking error signal computing circuit in detail.

The optical disk apparatus can further include second tracking error signal generating means (e.g., a DPD computing unit 65 of FIG. 5 in the tracking error signal computing circuit 22 shown in FIG. 1). The second tracking error signal generating means performs computation according to a differential phase detection (DPD) method using the outputs from the two light detecting portions formed in the first track-direction end area, the two light detecting portions formed in the second track-direction end area, and at least the four light detecting portions formed in the track-direction middle area (e.g., computation according to equation (4) or (11)) so as to generate the tracking error signal. The tracking control means can perform tracking control in accordance with the tracking error signal generated by the second tracking error signal generating means in place of the tracking error signal generated by the first tracking error signal generating means.

The optical disk apparatus can further include spherical aberration signal generating means (e.g., a spherical aberration signal computing circuit 23 shown in FIG. 1) and spherical aberration correcting means (e.g., the spherical aberration correction unit 4 and a spherical aberration control unit 27 for controlling the spherical aberration correction unit 4 shown in FIG. 1). The spherical aberration signal generating means performs a predetermined computation using the outputs from the two light detecting portions formed in the first track-direction end area and the two light detecting portions formed in the second track-direction end area (e.g., computation according to equation (5)) so as to generate a first focus error signal, performs a predetermined computation using the outputs from at least one area of at least the four light detecting portions formed in the track-direction middle area (e.g., computation according to equation (6)) so as to generate a second focus error signal, and performs a predetermined computation using the first focus error signal and the second focus error signal (e.g., computation according to equation (7)) so as to generate a spherical aberration signal. The spherical aberration correcting means corrects spherical aberration occurring when the light collecting means collects the light beam on the recording surface of the optical disk in accordance with the spherical aberration signal generated by the spherical aberration signal generating means.

The optical disk apparatus can further include a second moving means (e.g., a focus actuator 14 shown in FIG. 1), focus error signal generating means (e.g., a focus error signal computing circuit 21 shown in FIG. 1), and focus control means (e.g., a focus control unit 26 shown in FIG. 1). The second moving means moves the light collecting means in the direction perpendicular to the recording surface of the optical disk. The focus error signal generating means performs a predetermined computation using the outputs from the two light detecting portions formed in the first track-direction end area, the two light detecting portions formed in the second track-direction end area, and at least one area of at least the four light detecting portions formed in the track-direction middle area except for the light detecting portion required for detection of a relative offset between the track and the light beam (e.g., computation according to equation (2) or (9)) so as to generate a focus error signal. The focus control means performs focus control by driving the second moving means in accordance with the focus error signal generated by the focus error signal generating means.

The optical disk apparatus can further include reproduction signal generating means (e.g., a reproduction signal circuit 24 shown in FIG. 1). The reproduction signal generating means performs a predetermined computation using the outputs from the two light detecting portions formed in the first track-direction end area, the two light detecting portions formed in the second track-direction end area, and all of at least the four light detecting portions formed in the track-direction middle area so as to generate a reproduction signal. A photodiode is provided to each of the two light detecting portions formed in the first track-direction end area, the two light detecting portions formed in the second track-direction end area, and all of at least the four light detecting portions formed in the track-direction middle area (e.g., photodiodes 9-A to 9-H shown in FIG. 1). Cathodes of the photodiodes are connected to the first tracking error signal generating means and the beam-spot offset detecting means while anodes of the photodiodes are connected to the reproduction signal generating means. Alternatively, the anodes of the photodiodes may be connected to the first tracking error signal generating means and the beam-spot offset detecting means while the cathodes of the photodiodes may be connected to the reproduction signal generating means. For example, as shown in FIG. 1, eight photodiodes 9-A to 9-H are connected so that a tracking error signal TE is output from cathodes of the eight photodiodes 9-A to 9-H whereas an optical disk reproduction signal is output from anodes of the eight photodiodes 9-A to 9-H.

Figure 6:
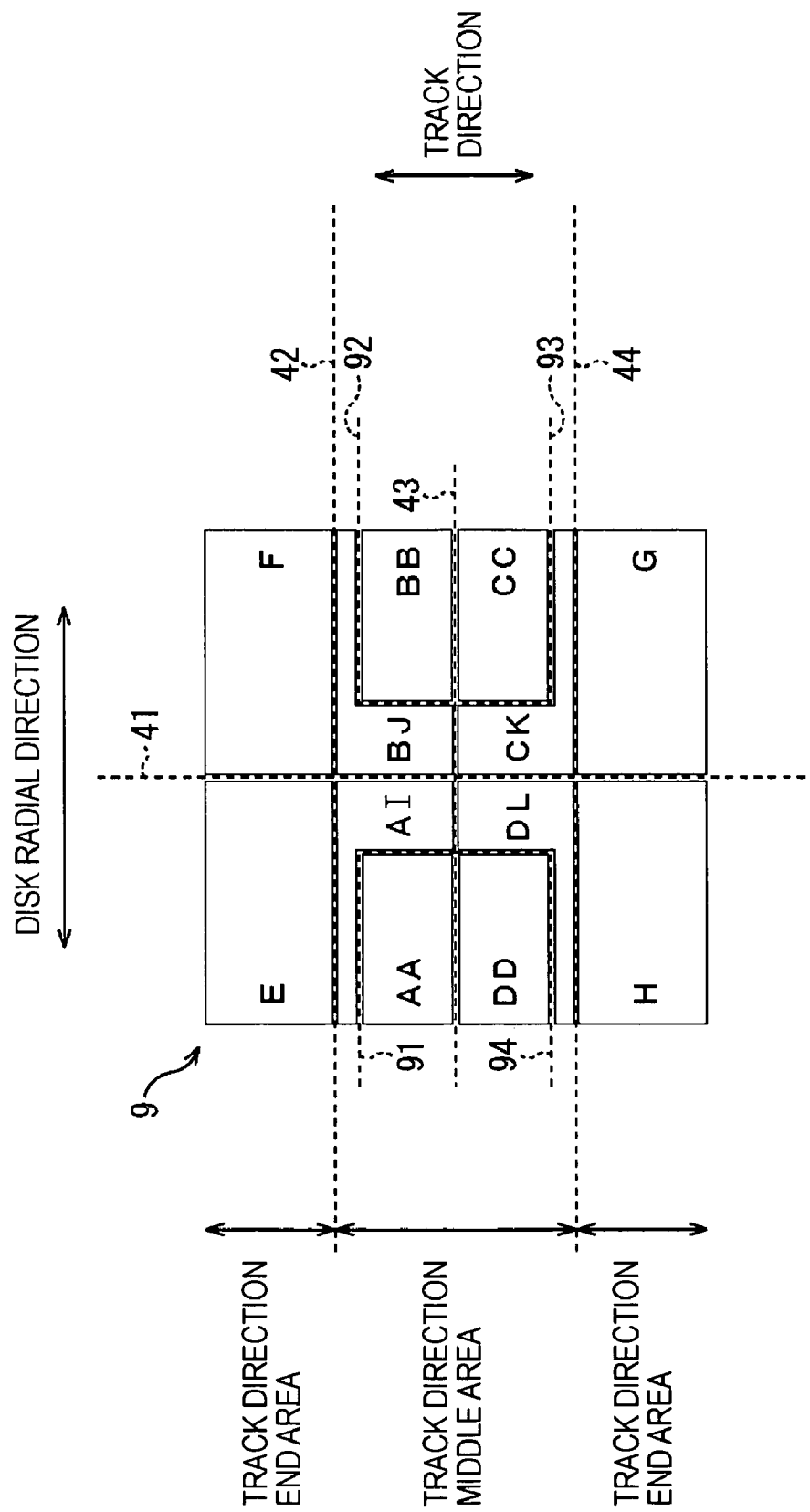
FIG. 6 illustrates a light receiving surface of the light detecting unit according to an embodiment of the present invention, which is different from the light receiving surface shown in FIG. 2.

In the light detecting means (e.g., the light detecting unit 9 shown in FIG. 6) of this optical disk apparatus, the track-direction middle area can be divided into two in the direction perpendicular to the track direction and the light receiving element can be divided into two in the direction parallel to the track direction so that four light detecting portions are formed in the track-direction middle area. Furthermore, each of the four light detecting portions formed in the track-direction middle area can be divided into two, one of which is adjacent to the outer periphery of the light receiving element and the other of which is adjacent to the middle of the light receiving element. As a result, eight light detecting portions can be formed in the track-direction middle area. For example, as shown in FIG. 6, light detecting portions AA, BB, CC, and DD can be formed on the side adjacent to the outer periphery of the light receiving element. Also, light detecting portions AI, BJ, CK, and DL can be formed on the side adjacent to the middle of the light receiving element.

The optical disk apparatus can further include spherical aberration signal generating means (e.g., a spherical aberration signal computing circuit 23 shown in FIG. 1) and spherical aberration correcting means (e.g., the spherical aberration correction unit 4 and a spherical aberration control unit 27 for controlling the spherical aberration correction unit 4 shown in FIG. 1). The spherical aberration signal generating means performs a predetermined computation using the outputs from the two light detecting portions formed in the first track-direction end area, the two light detecting portions formed in the second track-direction end area, and the four light detecting portions of the eight light detecting portions formed in the track-direction middle area adjacent to the outer periphery of the light receiving element (e.g., computation according to equation (12)) so as to generate a first focus error signal, performs a predetermined computation using the outputs from the four light detecting portions of the eight light detecting portions formed in the track-direction middle area adjacent to the middle of the light receiving element (e.g., computation according to equation (13)) so as to generate a second focus error signal, and performs a predetermined computation using the first focus error signal and the second focus error signal (e.g., computation according to equation (14)) so as to generate a spherical aberration signal. The spherical aberration correcting means corrects spherical aberration occurring when the light collecting means collects the light beam on the recording surface of the optical disk in accordance with the spherical aberration signal generated by the spherical aberration signal generating means.

Each of the four light detecting portions of the eight light detecting portions formed in the track-direction middle area adjacent to the middle of the light receiving element can have an L shape (e.g., the shapes of the light detecting portions AI, BJ, CK, and DL shown in FIG. 6) and one of the ends of the L-shaped light detecting portion can be positioned at the peripheral portion of the light receiving element.

According to another embodiment of the present invention, there is provided a pickup unit. The pickup unit (e.g., a pickup unit including components from a light source 1 to a head amplifier 10 shown in FIG. 1) is included in an optical disk apparatus (e.g., an optical disk apparatus shown in FIG. 1) for performing at least one of a recording operation and a reproduction operation of an information signal on and from an optical disk (e.g., an optical disk 31 shown in FIG. 1). The information signal is recorded or is to be recorded on the optical disk in a predetermined track format. The pickup unit includes a light receiving element (e.g., a light receiving element (light receiving surface) shown in FIG. 2 or 6) for receiving a light beam reflected off the optical disk. The surface of the light receiving element is divided into the following three areas in the direction perpendicular to the track direction of the optical disk: a first track-direction end area at one end, a second track-direction end area at the other end, and a track-direction middle area at the middle (e.g., areas shown in FIG. 2 or 6). The track-direction middle area is further divided into at least two in the direction perpendicular to the track direction. Furthermore, the light receiving element is divided into two in a direction parallel to the track direction. As a result, two light detecting portions are formed in the first track-direction end area (e.g., light detecting portions E and F shown in FIG. 2 or 6). Two light detecting portions are formed in the second track-direction end area (e.g., light detecting portions H and G shown in FIG. 2 or 6). Additionally, at least four light detecting portions are formed in the track-direction middle area (e.g., light detecting portions A to D shown in FIG. 2 or light detecting portions AA, BB, CC, DD, AI, BJ, CK, and DL shown in FIG. 6).

In this pickup unit (e.g., a pickup unit including components from a light source 1 to a head amplifier 10 shown in FIG. 1 or a pickup unit including a light detecting unit 9 shown in FIG. 6), the track-direction middle area can be divided into two in the direction perpendicular to the track direction and the light receiving element can be divided into two in the direction parallel to the track direction so that four light detecting portions are formed in the track-direction middle area. Furthermore, each of the four light detecting portions formed in the track-direction middle area can be divided into two, one of which is adjacent to the outer periphery of the light receiving element and the other of which is adjacent to the middle of the light receiving element. As a result, eight light detecting portions can be formed in the track-direction middle area. For example, as shown in FIG. 6, light detecting portions AA, BB, CC, and DD can be formed on the side adjacent to the outer periphery of the light receiving element. Also, light detecting portions AI, BJ, CK, and DL can be formed on the side adjacent to the middle of the light receiving element.

Exemplary embodiments of the present invention are described with reference to the accompanying drawings.

FIG. 1 illustrates an optical disk apparatus according to an embodiment of the present invention or an optical disk apparatus including a pickup unit according to an embodiment of the present invention. More precisely, FIG. 1 illustrates a block diagram of an optical system and a servo control system of the optical disk apparatus according to an embodiment of the present invention.

As shown in FIG. 1, the optical system of the optical disk apparatus includes components from a light source 1 through a light detecting unit 9.

The light source 1 is driven by a driving circuit (not shown) to emit a laser beam. The laser beam emitted from the light source 1 passes through a collimator lens 2 so that the laser beam becomes a parallel pencil of rays. The parallel pencil passes through a polarized beam splitter 3 and a spherical aberration correcting unit 4. The parallel pencil is then circularly polarized by a ¼ wavelength plate 5 and reaches an objective lens 6. The objective lens 6 collimates the parallel pencil from the ¼ wavelength plate 5 onto a recording surface (a surface shown by cross hatchings in FIG. 1) of an optical disk 31. A beam of light reflected off the surface of the optical disk 31 passes through the objective lens 6 so as to become a parallel pencil of rays. The parallel pencil passes through the ¼ wavelength plate 5 again. As a result, the parallel pencil is linearly polarized into a beam having a different polarized direction by 90 degrees. The beam then passes through the spherical aberration correcting unit 4 and is incident on the polarized beam splitter 3. The beam is reflected off the polarized beam splitter 3 and passes through a focusing lens 7 and a cylindrical lens 8. Finally, the beam reaches a light receiving surface (light receiving element) of the light detecting unit 9.

Thus, in the optical disk apparatus according to the present embodiment, a beam reflected off the recording surface of the optical disk 31 and incident on the light detecting unit 9, namely, a returning beam is a one-spot beam.

The light detecting unit 9 includes a light receiving surface divided into a plurality of light detecting portions. As shown in FIG. 1, the light detecting unit 9 includes, for example, eight photodiodes 9-A to 9-H corresponding to an example shown in FIG. 2, which is described below. That is, the light detecting unit 9 includes the eight photodiodes 9-A to 9-H corresponding to eight light detecting portions A to H, respectively.

Figure 9:
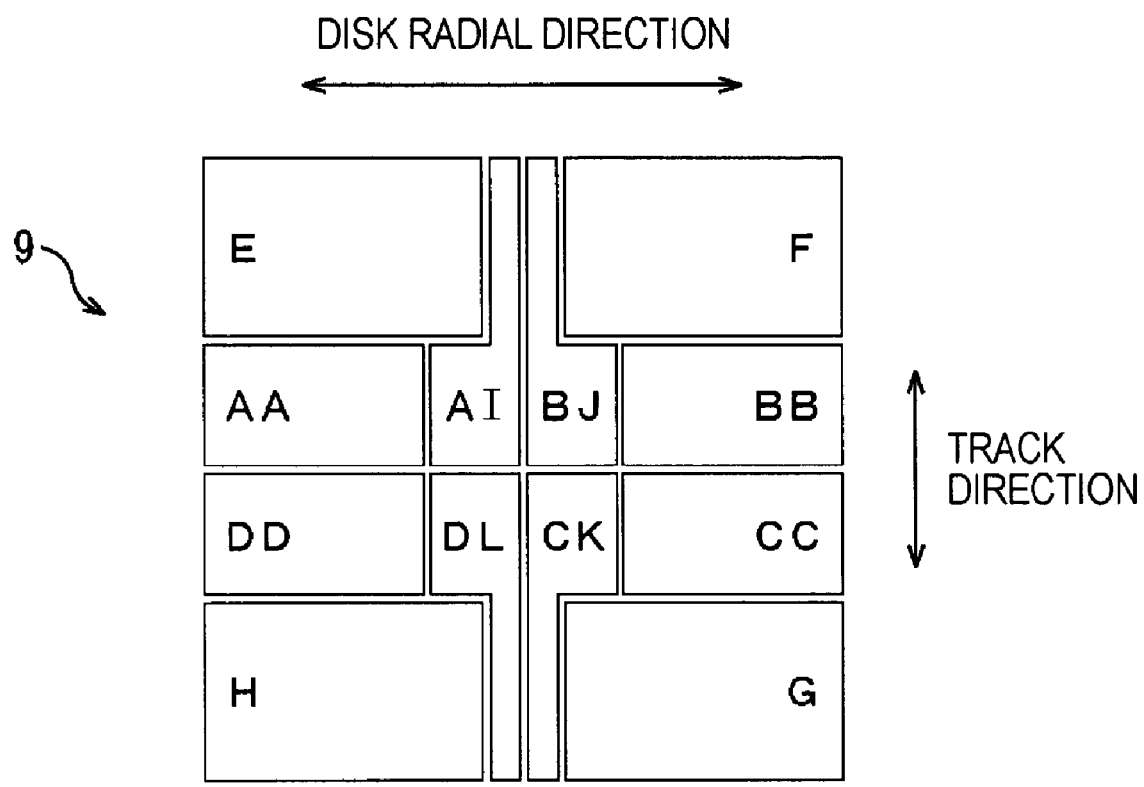
FIG. 9 illustrates a light receiving surface of the light detecting unit according to an embodiment of the present invention, which is different from the light receiving surfaces shown in FIGS. 2 and 6.

In other words, when the light detecting unit 9 supports light detecting portions shown in FIG. 6, 9, or 10, which are described below, that is, when the light detecting unit 9 supports twelve light detecting portions AA, BB, CC, DD, E, F, G, H, AI, BJ, CK, and DL (hereinafter referred to as "light detecting portions AA to DL"), twelve photodiodes 9-AA, 9-BB, 9-CC, 9-DD, 9-E, 9-F, 9-G, 9-H, 9-AI, 9-BJ, 9-CK, and 9-DL (none are shown) are provided to the light detecting unit 9. Furthermore, head amplifiers 10 are provided to the light detecting unit 9 so that the number of the head amplifiers 10 is equal to the number of the light detecting portions.

Figure 2:
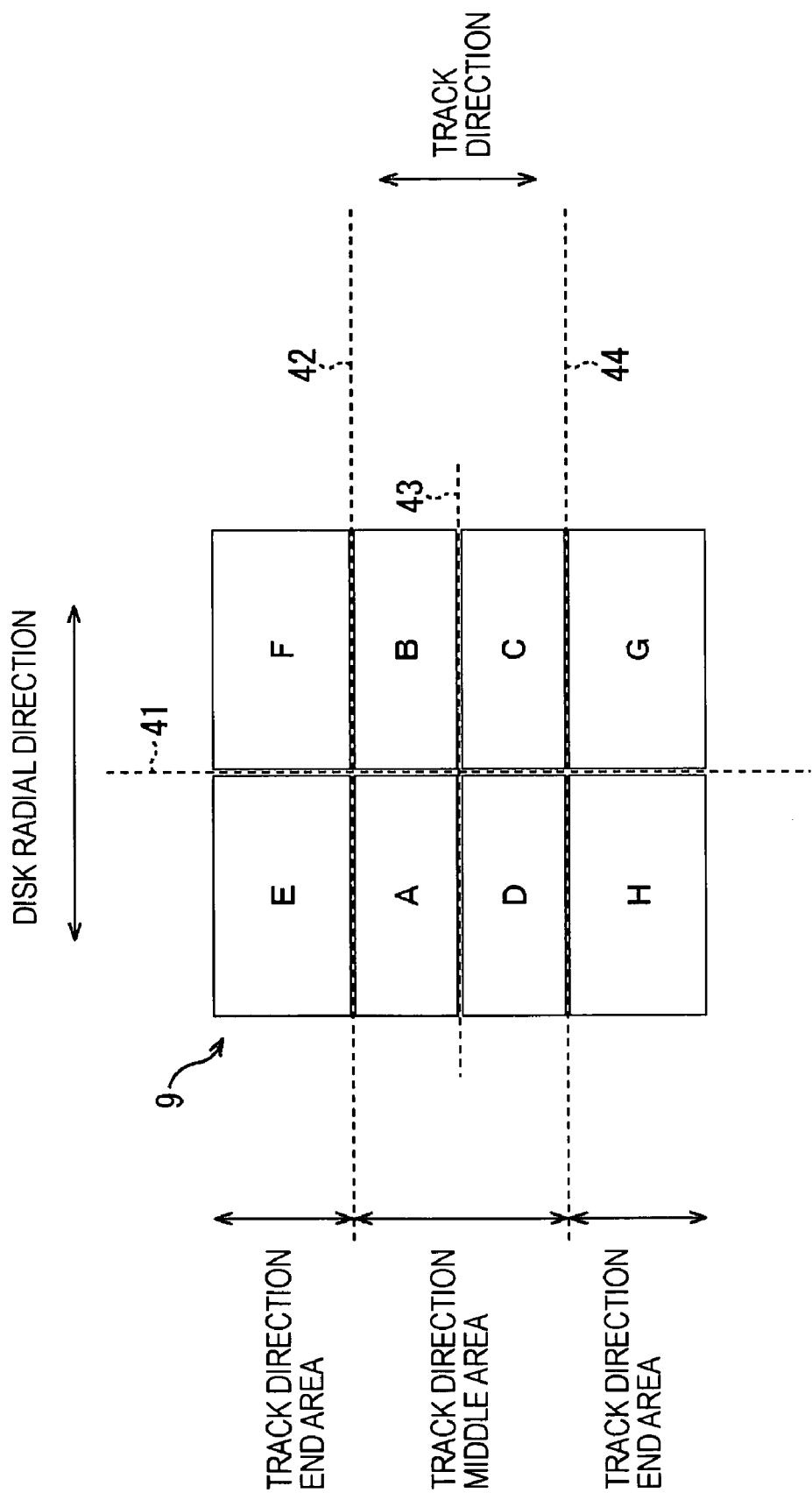
FIG. 2 illustrates an exemplary light receiving surface of the light detecting unit shown in FIG. 1 according to an embodiment of the present invention.
Figure 3:
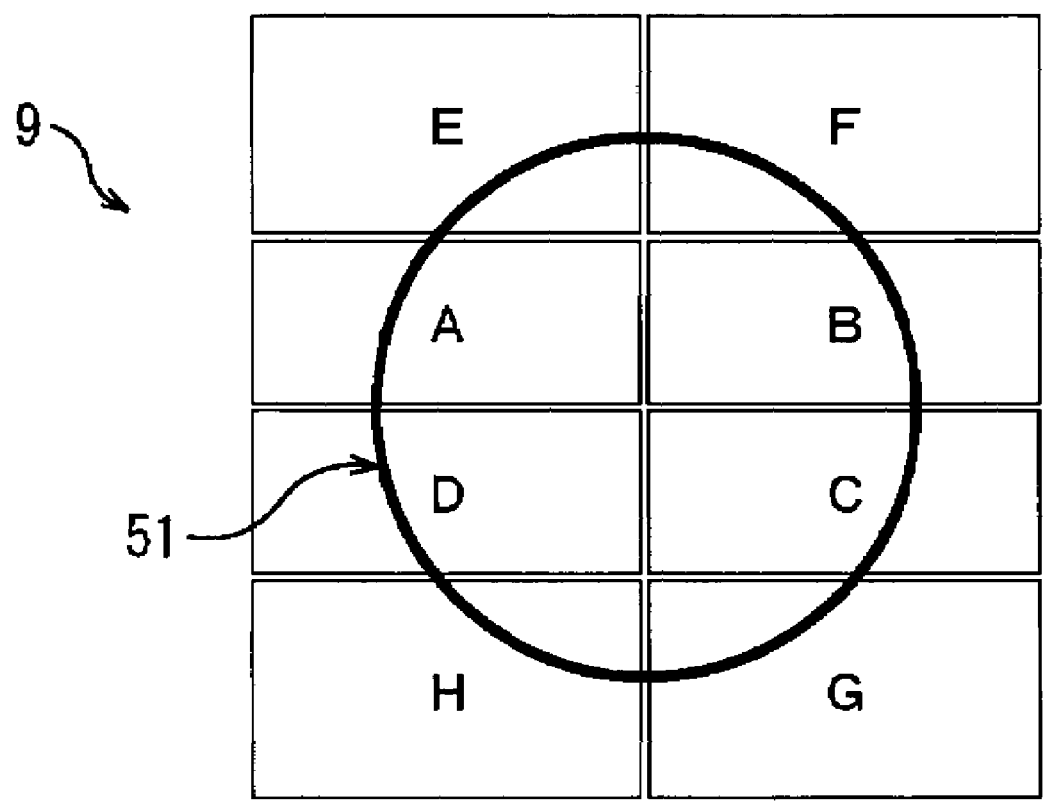
FIG. 3 illustrates an example of a light spot on the light receiving surface of the light detecting unit shown in FIG. 2 when there is no movement of an objective lens for following a track.

FIG. 2 illustrates an example of the light receiving surface of the light detecting unit 9. FIG. 3 illustrates an example of a light spot 51 on the light receiving surface of the light detecting unit 9 shown in FIG. 2 when there is no movement of the objective lens 6 shown in FIG. 1 for following a track (i.e., no movement of the objective lens 6 by means of a tracking actuator 13), while FIG. 4 illustrates an example of a light spot 51 on the light receiving surface of the light detecting unit 9 shown in FIG. 2 when there is a movement of the objective lens 6 shown in FIG. 1 for following the track.

Figure 4:
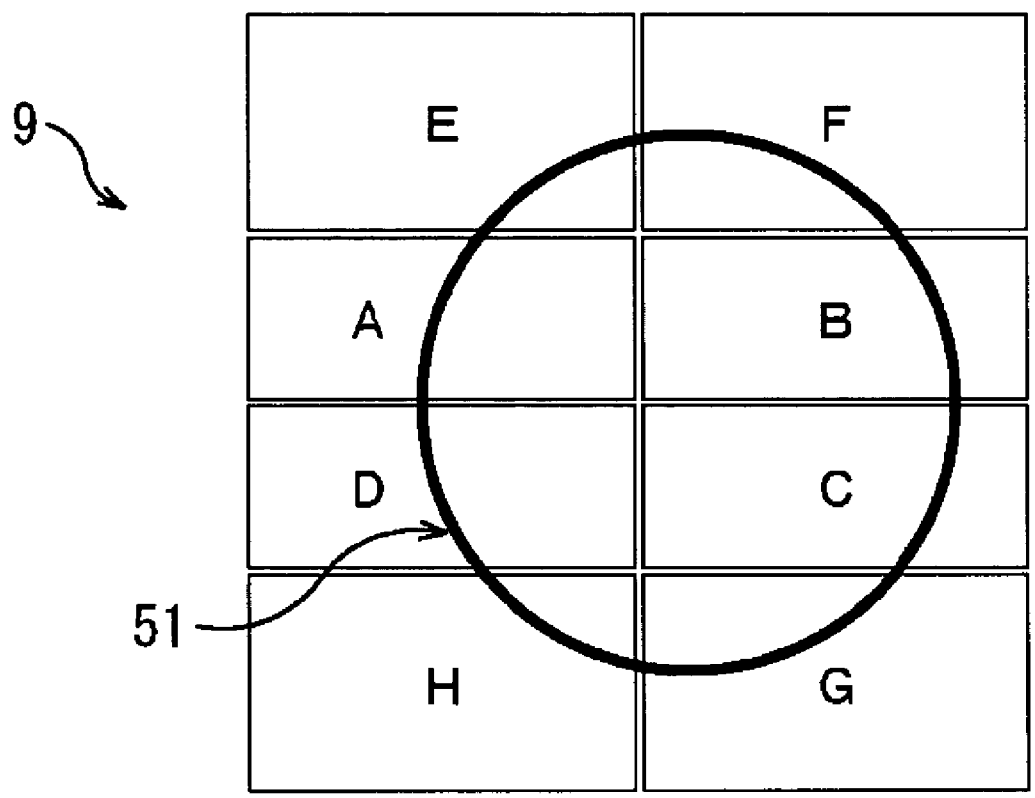
FIG. 4 illustrates an example of a light spot on the light receiving surface of the light detecting unit shown in FIG. 2 when there is a movement of the objective lens for following a track.

In FIGS. 2 through 4, the light receiving surface of the light detecting unit 9 is divided into eight light detecting portions A to H by a dividing line 41 substantially parallel to the tangential direction of a track of the optical disk 31 (see FIG. 1) (hereinafter referred to as a "track direction") and dividing lines 42 to 44 substantially parallel to the radial direction of the optical disk 31 (hereinafter referred to as a "disk radial direction").

More specifically, in FIGS. 2 through 4, the light receiving surface of the light detecting unit 9 is divided by the dividing lines 42 and 44 in a direction substantially perpendicular to the track direction (hereinafter simply referred to as a "perpendicular direction to the track direction") so that three light detecting portions are formed. Hereinafter, of the three light detecting portions, the middle light detecting portion is referred to as a "track-direction middle area". The two light detecting portions at the ends of the light receiving surface are referred to as "track-direction end areas". The track-direction middle area is further divided into two light detecting portions by the dividing line 43. Each of the track-direction end areas and each of the two light detecting portions obtained by dividing the track-direction middle area are divided into two by the dividing line 41 in a direction substantially perpendicular to the disk radial direction, namely, in the direction substantially parallel to the track direction (hereinafter simply referred to as a "parallel to the track direction"). As a result, the eight light detecting portions A to H are formed on the light receiving surface of the light detecting unit 9.

It is noted that, in FIGS. 2 to 4, the eight light detecting portions A to H are defined as follows. In the light receiving surface shown in FIG. 2, four divided areas in the track-direction middle area are defined as light detecting portions A to D from the upper left in the clockwise direction. Of the two divided light detecting portions in the track-direction end area adjacent to the light detecting portions A and B (i.e., the upper track-direction end area in FIG. 2), the area adjacent to the light detecting portion A (i.e., the left area in FIG. 2) is defined as a light detecting portion E while the area adjacent to the light detecting portion B (i.e., the right area in FIG. 2) is defined as a light detecting portion F. Additionally, of the two divided light detecting portions in the track-direction end area adjacent to the light detecting portions C and D (i.e., the lower track-direction end area in FIG. 2), the area adjacent to the light detecting portion C (i.e., the right area in FIG. 2) is defined as a light detecting portion G while the area adjacent to the light detecting portion D (i.e., the left area in FIG. 2) is defined as a light detecting portion H.

Referring back to FIG. 1, the photodiodes 9-A to 9-H are disposed in the above-described eight light detecting portions A to H (see FIG. 2) of the light detecting unit 9, respectively. Cathodes of the photodiodes 9-A to 9-H are connected to input terminals of head amplifiers 10-A to 10-H, respectively. Anodes of the photodiodes 9-A to 9-H are all connected to an input terminal of a head amplifier 10-I.

That is, as described below, output terminals of the head amplifiers 10-A to 10-H are at least connected to a tracking error signal computing circuit 22, which outputs a tracking error signal TE. An output terminal of the head amplifier 10-I is connected to a reproduction signal circuit 24, which outputs an optical disk reproduction signal. Accordingly, the optical disk apparatus shown in FIG. 1 can output the tracking error signals TE from the cathodes of the eight photodiodes 9-A to 9-H and can output the optical disk reproduction signals from the anodes of the eight photodiodes 9-A to 9-H.

It should be noted that the eight photodiodes 9-A to 9-H may be connected to the head amplifiers 10-A and 10-I in the reverse manner. That is, although not shown, the anodes of the eight photodiodes 9-A to 9-H may be connected to the input terminals of the head amplifiers 10-A and 10-H, respectively. The cathodes of the eight photodiodes 9-A to 9-H may be all connected to the input terminal of the head amplifier 10-I. In this reverse connection manner, an optical disk apparatus (not shown) can output the tracking error signals TE from the cathodes of the eight photodiodes 9-A to 9-H and can output the optical disk reproduction signals from the anodes of the eight photodiodes 9-A to 9-H.

Components from the head amplifier 10 through a controller 15 shown in FIG. 1 serve as a servo control system for driving the above-described objective lens 6 of the optical system and the spherical aberration correcting unit 4.

When considered from another perspective, the optical disk apparatus shown in FIG. 1 serves as a pickup unit according to an embodiment of the present invention. Also, the optical disk apparatus shown in FIG. 1 can be considered to be configured with a pickup unit including components from the light source 1 to the head amplifier 10 and components from a signal computing circuit 11 to the controller 15.

Output signals from the head amplifier 10 are delivered to the signal computing circuit 11. As shown in FIG. 1, the signal computing circuit 11 includes components from a focus error signal computing circuit 21 through the reproduction signal circuit 24.

The following descriptions (descriptions before description of FIG. 6 starts) are provided with reference to output levels a to h of the light detecting portions A to H (the cathodes of the photodiodes 9-A to 9-H), precisely speaking, output levels a to h of the head amplifiers 10-A to 10-H, respectively.

The optical disk apparatus shown in FIG. 1 obtains a focus error signal FE using an astigmatism method. Therefore, the focus error signal computing circuit 21 can compute and output the focus error signal FE using, for example, the following equation:

$$FE=(a+c+e+g)-(b+d+f+h). \quad (1)$$

Alternatively, the focus error signal computing circuit 21 can compute and output the focus error signal FE using, for example, the following equation:

$$FE=(e+g)-(f+h). \quad (2)$$

Here, equation (2) is computed without using the light detecting portions A to D that detect a push-pull signal level (relative offset between a track and a light beam). Accordingly, the computed focus error signal FE results in a focus error signal with little crosstalk at the push-pull signal level. Consequently, when the optical disk 31 having a large push-pull signal level like a DVD-RAM is played back using the astigmatism method, a stable focusing servo operation can be achieved.

The focus error signal FE computed according to equation (1) or (2) is delivered from the focus error signal computing circuit 21 to a focus control unit 26 of a servo control unit 12, which is described below.

Additionally, the tracking error signal computing circuit 22 can compute and output the tracking error signal TE using a one spot push-pull (PP) method when the optical disk 31 of a writable type is used and using a differential phase detection (DPD) method when the optical disk 31 of a reproduction-only (ROM) type on which a information pit line is formed in advance is used.

More specifically, in the one spot push-pull method, the tracking error signal TE is computed according to, for example, the following equation:

$$TE\text{-}PP=\{(a+d)-(b+c)\}-\alpha*\{(e+h)-(f+g)\} \quad (3)$$

where $\alpha$ denotes a coefficient.

It is noted that the tracking error signal TE is expressed as the tracking error signal TE–PP to indicate that the tracking error signal TE is computed by the one spot push-pull method. That is, in equation (3), the term $\{(a+d)-(b+c)\}$ corresponds to the detection of a push-pull signal level (relative offset between a track and a light beam) while the term $\{(e+h)-(f+g)\}$ corresponds to the detection of a lens moving signal level (the relative offset of a beam spot on the light receiving element). Consequently, in the tracking error signal TE–PP obtained from equation (3), the lens moving signal level is removed from the push-pull signal level. As a result, the tracking error signal TE–PP results in a stable tracking error signal without an offset.

Additionally, in the differential phase detection method, the tracking error signal TE is computed using, for example, the following equation:

$$TE\text{-}DPD=\phi(a+c+e+g)-\phi(b+d+f+h) \quad (4)$$

where the operator $\phi$ denotes a signal phase.

It is noted that the tracking error signal TE is expressed as the tracking error signal TE–DPD to indicate that the tracking error signal TE is computed by the differential phase detection method.

As described above, the tracking error signal computing circuit 22 can compute the above-described equation (3) or (4) and can output the computation result as the tracking error signal TE. In this case, the tracking error signal computing circuit 22 can have the configuration shown in, for example, FIG. 5. That is, FIG. 5 illustrates the configuration of the tracking error signal computing circuit 22 in detail.

As shown in FIG. 5, the tracking error signal computing circuit 22 includes components from a beam-spot offset computing unit 61 to a tracking error signal selection unit 66.

The beam-spot offset computing unit 61 computes the lens moving signal level (relative offset of a beam spot on the light receiving element), that is, computes the term $\{(e+h)-(f+g)\}$ in equation (3).

Accordingly, the beam-spot offset computing unit 61 includes a computing unit 71 that computes (e+h), a computing unit 72 that computes (f+g), a computing unit 73 that computes the sum of the computation results from the computing units 71 and 72 (i.e., that computes $\{(e+h)+(f+g)\}$), and a computing unit 74 that computes a difference between the computation results from the computing units 71 and 72 (i.e., that computes $\{(e+h)-(f+g)\}$). The computation results from the computing unit 73 and the computing unit 74 are delivered to an auto gain control (AGC) unit 79 of a gain control unit 63.

Additionally, a tracking error computing unit 62 computes an uncorrected tracking error signal, that is, computes the push-pull signal level (relative offset between a track and a light beam). More specifically, the tracking error computing unit 62 computes the term $\{(a+d)-(b+c)\}$ in equation (3).

Accordingly, the tracking error computing unit 62 includes a computing unit 75 that computes (a+d), a computing unit 76 that computes (b+c), a computing unit 77 that computes the sum of the computation results from the computing units 75 and 76 (i.e., that computes $\{(a+d)+(b+c)\}$), and a computing unit 78 that computes a difference between the computation results from the computing units 75 and 76 (i.e., that computes $\{(a+d)-(b+c)\}$). The computation results from the computing unit 77 and the computing unit 78 are delivered to an AGC unit 80 of the gain control unit 63.

The AGC unit 79 of the gain control unit 63 adjusts the gain of the output signal of the computing unit 74, namely, the gain of $\{(e+h)-(f+g)\}$ on the basis of the output signal from the computing unit 73. The AGC unit 79 then delivers the adjusted gain of $\{(e+h)-(f+g)\}$ to a computing unit 82 of an offset correction computing unit 64.

The AGC unit 80 of the gain control unit 63 adjusts the gain of the output signal of the computing unit 78, namely, the gain of $\{(a+d)-(b+c)\}$ on the basis of the output signal from the computing unit 77. The AGC unit 80 then delivers the adjusted gain of $\{(a+d)-(b+c)\}$ to a computing unit 83 of the offset correction computing unit 64.

The offset correction computing unit 64 corrects the tracking error signal delivered from the tracking error computing unit 62 via the AGC unit 80 (i.e., $\{(a+d)-(b+c)\}$) on the basis of the signal delivered from the beam-spot offset computing unit 61 via the AGC unit 79 (i.e., $\{(e+h)-(f+g)\}$ corresponding to the relative offset of a beam spot). The offset correction computing unit 64 then delivers the corrected tracking error signal TE–PP to the tracking error signal selection unit 66.

That is, the offset correction computing unit 64 computes equation (3). Accordingly, the offset correction computing unit 64 includes a gain setting unit 81 that sets the gain α of equation (3) under the control of the controller 15, a computing unit 82 that computes the term $\alpha^{*}\{(e+h)-(f+g)\}$ using the set gain α, and a computing unit 83 that computes a difference between $\{(a+d)-(b+c)\}$ output from the AGC unit 80 and $\alpha^{*}\{(e+h)-(f+g)\}$ output from the computing unit 82 (i.e., that computes $\{(a+d)-(b+c)\}-\alpha^{*}\{(e+h)-(f+g)\}$).

A DPD computing unit 65 computes the above-described equation (4) and outputs the computation result (i.e., the tracking error signal TE–DPD) to the tracking error signal selection unit 66.

The tracking error signal selection unit 66 selects either one of the tracking error signal TE–PP delivered from the offset correction computing unit 64 and the tracking error signal TE–DPD delivered from the DPD computing unit 65 on the basis of the tracking error selection signal delivered from the controller 15. The tracking error signal selection unit 66 then delivers the selected one to a tracking control unit 25 shown in FIG. 1 of the servo control unit 12 as the tracking error signal TE.

It is noted that, in this embodiment, the tracking error selection signal represents a signal that indicates the type of the optical disk 31 (see FIG. 1). More specifically, for example, upon receiving a signal indicating a recordable disk delivered from the controller 15 as a tracking error selection signal, the tracking error signal selection unit 66 delivers the tracking error signal TE–PP received from the offset correction computing unit 64 to the tracking control unit 25 as the tracking error signal TE. In contrast, upon receiving a signal indicating a reproduction-only (ROM) disk delivered from the controller 15 as a tracking error selection signal, the tracking error signal selection unit 66 delivers the tracking error signal TE–DPD received from the DPD computing unit 65 to the tracking control unit 25 as the tracking error signal TE.

Referring back to FIG. 1, a spherical aberration signal computing circuit 23 computes a second focus error signal FE2 (a focus error signal FE2 at the periphery of the light spot 51 shown in FIG. 3 or 4) according to, for example, the following equation:

$$FE2=(e+g)-(f+h). \quad (5)$$

Additionally, the spherical aberration signal computing circuit 23 can compute a third focus error signal FE3 (a focus error signal FE3 at the inner periphery of the light spot 51) according to, for example, the following equation:

$$FE3=(a+c)-(b+d). \quad (6)$$

Then, the spherical aberration signal computing circuit 23 assigns these two focus error signals FE2 and FE3 to the right part of the following equation (7) to obtain a spherical aberration signal SA:

$$SA=FE2-\beta^{*}(FE3) \quad (7)$$

where β denotes a coefficient.

The spherical aberration signal SA computed according to equations (5) to (7) is delivered from the spherical aberration signal computing circuit 23 to a spherical aberration control unit 27 of the servo control unit 12, which is described below.

Additionally, the reproduction signal circuit 24 generates an optical disk reproduction signal on the basis of the output signal from the head amplifier 10-I (an output level of all of the anodes of the photodiodes 9-A to 9-H) and outputs the generated optical disk reproduction signal. That is, the reproduction signal circuit 24 computes the sum of the output levels a to h of all of the light detecting portions A to H of the light detecting unit 9 so as to generate and output the optical disk reproduction signal.

The servo control unit 12 shown in FIG. 1 includes components from the tracking control unit 25 to the spherical aberration control unit 27.

The tracking control unit 25 drives a tracking actuator 13 in accordance with the tracking error signal TE delivered from the tracking error signal computing circuit 22 so as to perform tracking control (control to move the objective lens 6 in a direction perpendicular to the track direction). In other words, the tracking actuator 13 is driven by the tracking control unit 25 so as to move the objective lens 6 in a direction perpendicular to the track direction.

The focus control unit 26 drives a focus actuator 14 in accordance with the focus error signal FE delivered from the focus error signal computing circuit 21 so as to perform focus control (control to move the objective lens 6 in a direction perpendicular to the recording surface of the optical disk 31, namely, in a focus direction). In other words, the focus actuator 14 is driven by the focus control unit 26 so as to move the objective lens 6 in the focus direction.

The spherical aberration control unit 27 controls the spherical aberration correcting unit 4 to correct spherical aberration occurring when the objective lens 6 collects light beams on the recording surface of the optical disk 31 in accordance with the spherical aberration signal SA delivered from the spherical aberration signal computing circuit 23.

More specifically, for example, when the spherical aberration of a light beam emitted onto the optical disk 31 is small and is in focus, the intensity of the light spot 51 formed on the receiving surface of the light detecting unit 9 is substantially uniform over the entire spot. Accordingly, as can be seen from equations (5) to (7), the two focus error signals FE2 and FE3 are substantially zero. As a result, the intensity of the spherical aberration signal SA is substantially zero. In this case, the spherical aberration control unit 27 disables the correction control of the spherical aberration correcting unit 4.

In contrast, when spherical aberration is introduced in the light beam emitted onto the optical disk 31, different light intensity distributions are generated in the inner periphery and the outer periphery of the light spot 51 formed on the receiving surface of the light detecting unit 9. Consequently, the values of the two focus error signals FE2 and FE3 are different. As a result, the spherical aberration signal SA has a certain value other than zero. Using the spherical aberration signal SA having this non-zero value, the spherical aberration can be detected. Accordingly, in this case, the spherical aberration control unit 27 performs the correction control of the spherical aberration correcting unit 4 on the basis of the detection result.

The controller 15 performs overall control of the optical disk apparatus, that is, performs control of a spindle motor (not shown) in addition to the signal computing circuit 11 and the servo control unit 12.

So far, the light detecting unit 9 having the light receiving surface shown in FIG. 2 (i.e., the light detecting unit 9 having eight separate light detecting portions A to H) has been described.

However, according to an embodiment of the present invention, the light detecting unit 9 is not limited to that shown in FIG. 2. Alternatively, a variety of embodiments can be provided.

For example, the light detecting unit 9 having a light receiving surface shown in FIG. 6 can be employed. That is, FIG. 6 illustrates a light receiving surface of the light detecting unit 9, which is different from the light receiving surface shown in FIG. 2.

Figure 7:
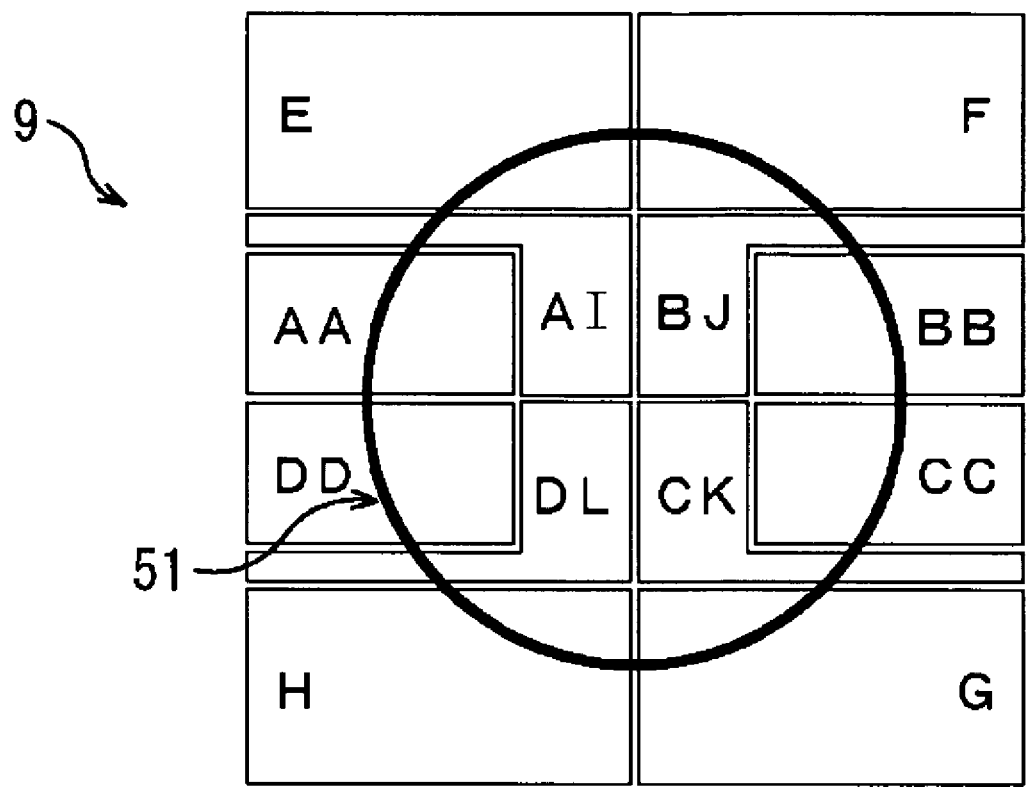
FIG. 7 illustrates an example of a light spot on the light receiving surface of the light detecting unit shown in FIG. 6 when there is no movement of an objective lens for following a track.
Figure 8:
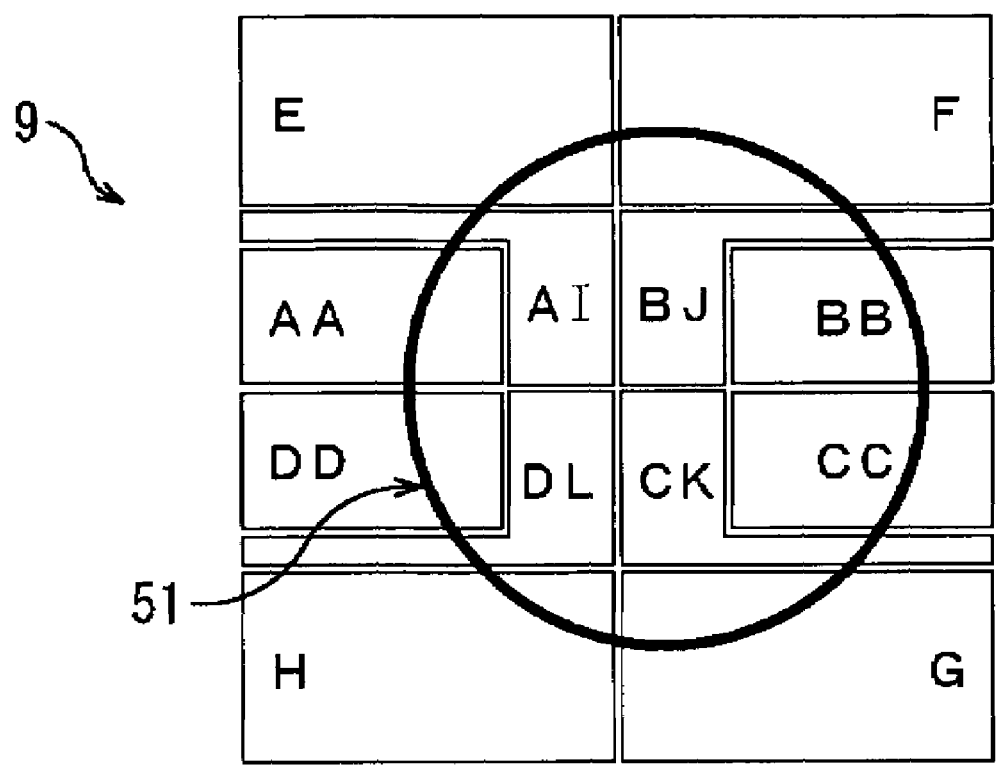
FIG. 8 illustrates an example of a light spot on the light receiving surface of the light detecting unit shown in FIG. 6 when there is a movement of the objective lens for following a track.

Additionally, FIG. 7 illustrates an example of the light spot 51 when the objective lens 6 (see FIG. 1) does not move in order to follow the track on the light receiving surface of the light detecting unit 9 shown in FIG. 6, while FIG. 8 illustrates an example of the light spot 51 when the objective lens 6 (see FIG. 1) moves in order to follow the track on the light receiving surface of the light detecting unit 9 shown in FIG. 6.

As shown in FIGS. 6 to 8, the light receiving surface of the light detecting unit 9 is divided by the dividing lines 41 to 44 as shown in FIGS. 2 to 4. The light receiving surface of the light detecting unit 9 is further divided into twelve light detecting portions AA to DL by dividing lines 91 to 94.

That is, in FIGS. 2 to 4, the track-direction middle area is divided into the four light detecting portions A to D. In contrast, in FIGS. 6 to 8, each of the four light detecting portions A to D is divided into two by one of dividing lines 91 to 94.

In FIGS. 6 to 8, of the two light detecting portions obtained by dividing the light detecting portion A by the dividing line 91, the area adjacent to the outer periphery of the light receiving surface (i.e., the middle left area in FIG. 6) is referred to as a "light detecting portion AA," and the area adjacent to the middle of the light receiving surface (i.e., the middle right area in FIG. 6) is referred to as a "light detecting portion AI." Similarly, of the two light detecting portions obtained by dividing the light detecting portion B by the dividing line 92, the area adjacent to the outer periphery of the light receiving surface (i.e., the middle right area in FIG. 6) is referred to as a "light detecting portion BB," and the area adjacent to the middle of the light receiving surface (i.e., the middle left area in FIG. 6) is referred to as a "light detecting portion BJ." Of the two light detecting portions obtained by dividing the light detecting portion C by the dividing line 93, the area adjacent to the outer periphery of the light receiving surface (i.e., the middle right area in FIG. 6) is referred to as a "light detecting portion CC," and the area adjacent to the middle of the light receiving surface (i.e., the middle left area in FIG. 6) is referred to as a "light detecting portion CK." Of the two light detecting portions obtained by dividing the light detecting portion D by the dividing line 94, the area adjacent to the outer periphery of the light receiving surface (i.e., the middle left area in FIG. 6) is referred to as a "light detecting portion DD," and the area adjacent to the middle of the light receiving surface (i.e., the middle right area in FIG. 6) is referred to as a "light detecting portion DL."

Each of the light detecting portions AI, BJ, CK, and DL, which is located in the track-direction middle area and is located adjacent to the middle of the light receiving surface, has an L shape so that a photodiode mounted thereon is connected to a head amplifier (although the photodiode and the head amplifier 10 connected to a cathode of the photodiode are not shown in FIG. 1). That is, each of the light detecting portions AI, BJ, CK, and DL has an L shape in order to deliver the output signal thereof to the head amplifier. It should be noted that the L shape is not necessarily a precise L shape. As used herein, the term "L shape" refers to a shape in which one end of one line is connected to one end of the other line and the two lines are not parallel to each other (i.e., the two lines do not form one line).

In other words, one of the two ends of each of the light detecting portions AI, BJ, CK, and DL having an L shape (i.e., an end opposite to the end at which the two lines are connected) is disposed in the outer peripheral portion of the light receiving surface of the light detecting unit 9. The output signal is retrieved from the end disposed in the outer peripheral portion of the light receiving surface of the light detecting unit 9. Hereinafter, the ends of the light detecting portions AI, BJ, CK, and DL having an L shape from which the output signals are retrieved are referred to as "signal output ends".

In FIGS. 6 to 8, the signal output ends of the light detecting portions AI, BJ, CK, and DL are disposed on a side substantially parallel to the track direction among the sides forming the periphery of the light receiving surface of the light detecting unit 9. However, the disposed positions are not limited thereto. The disposed position may be any position in the peripheral portion of the light receiving surface of the light detecting unit 9. More specifically, for example, as shown in FIG. 9, the signal output ends of the light detecting portions AI, BJ, CK, and DL may be disposed on a side substantially parallel to the disk radial direction (direction perpendicular to the track direction) among the peripheral sides of the light receiving surface of the light detecting unit 9. That is, FIG. 9 illustrates a light receiving surface of the light detecting unit 9 according to an embodiment of the present invention different from the light receiving surfaces shown in FIGS. 2 and 6. It is noted that the dividing lines are not shown in FIG. 9.

In other words, in FIGS. 6 to 8, it can be said that the light detecting portions AI, BJ, CK, and DL in the track-direction middle area adjacent to the middle of the light receiving surface extend the areas thereof to the periphery of the light detecting portion via border portions between each of the track-direction end areas and the track-direction middle area so that each of the light detecting portions AI, BJ, CK, and DL has an L shape. In contrast, in FIG. 9, it can be said that the light detecting portions AI, BJ, CK, and DL extend the areas thereof to the periphery of the light detecting portion via a border portion (the dividing line 41 in FIG. 6) that divides the light receiving surface into two in the direction perpendicular to the disk radial direction (track direction) so that each of the light detecting portions AI, BJ, CK, and DL has an L shape.

Furthermore, the shapes of the light detecting portions AI, BJ, CK, and DL are not limited to an L shape. Alternatively, the shapes of the light detecting portions AI, BJ, CK, and DL may be any shape that can retrieve the output signal. More specifically, the shapes of the light detecting portions AI, BJ, CK, and DL may be rectangular as shown in FIG. 10. That is, FIG. 10 illustrates a light receiving surface that is different from those shown in FIGS. 2, 6, and 9. It is noted that the dividing lines are not shown in FIG. 10.

In the light receiving surface shown in FIG. 10, since each of twelve light detecting portions AA to DL has a rectangular shape, the output signal can be retrieved therefrom by means of an interconnection line. In FIG. 10, interconnection line areas (signal retrieval portions) have the same reference numerals as those of the corresponding light detecting portions with the addition of the suffix "–S".

In other words, by retrieving the output signal using, for example, the interconnection line, each of the light detecting portions AI, BJ, CK, and DL located adjacent to the middle of the track-direction middle area can have any shape other than an L shape.

When the light receiving surface of the light detecting unit 9 is divided into the twelve light detecting portions AA to DL as shown in FIGS. 6 to 8, FIG. 9, and FIG. 10, the focus error signal FE, the tracking error signal TE, and the spherical aberration signal SA can be computed, for example, as follows.

It should be noted that, in this case, the optical disk includes the light detecting unit 9 having photodiodes (not shown) respectively corresponding to the twelve light detecting portions AA to DL and the head amplifiers 10 respectively corresponding to the photodiodes.

Additionally, the outputs from the twelve head amplifiers 10 respectively corresponding to the twelve light detecting portions AA to DL are delivered to the signal computing circuit 11. Hereinafter, the output levels of the light detecting portions AA, BB, CC, and DD (precisely speaking, the output levels of the corresponding head amplifiers) are referred to as a to d, respectively. Also, the output levels of the light detecting portions E, F, G, and H (precisely speaking, the output levels of the corresponding head amplifiers) are referred to as e to h, respectively. Further also, the output levels of the light detecting portions AI, BJ, CK, and DL (precisely speaking, the output levels of the corresponding head amplifiers) are referred to as i to l, respectively.

In this case, the focus error signal computing circuit 21 can output the computation result of, for example, the following equation as the focus error signal FE:

$$FE=(a+c+e+g+i+k)-(b+d+f+h+j+l). \tag{8}$$

Alternatively, the focus error signal computing circuit 21 can output the computation result of, for example, the following equation as the focus error signal FE:

$$FE=(e+g+i+k)-(f+h+j+l). \tag{9}$$

Here, since this equation does not use the light detecting portions AA, BB, CC, and DD that detect the push-pull signal level (relative offset between the track and the light beam), the focus error signal FE computed according to equation (9) results in a focus error signal with little crosstalk at the push-pull signal level. Consequently, when the optical disk 31 that has a large push-pull signal level like a DVD-RAM is played back using the astigmatism method, a stable focusing servo operation can be achieved.

In addition, when a recordable disk is used as the optical disk 31, the tracking error signal computing circuit 22 can compute and output the tracking error signal TE using the one spot push-pull (PP) method. In contrast, when a reproduction-only optical (ROM) disk is used as the optical disk 31, the tracking error signal computing circuit 22 can compute and output the tracking error signal TE primarily using the differential phase detection (DPD) method.

More specifically, in the one spot push-pull (PP) method, the tracking error signal TE is computed according to, for example, the following equation:

$$TE-PP=\{(a+d)-(b+c)\}-\alpha^{*}\{(e+h)-(f+g)\} \tag{10}$$

where $\alpha$ denotes a coefficient.

It is noted that the tracking error signal TE is expressed as the tracking error signal TE–PP to indicate that the tracking error signal TE is computed by the one spot push-pull method. That is, in equation (10), the term $\{(a+d)-(b+c)\}$ corresponds to the detection of a push-pull signal level (relative offset between a track and a light beam) while the term $\{(e+h)-(f+g)\}$ corresponds to the detection of a lens moving signal level (the relative offset of a beam spot on a light receiving element). Consequently, in the tracking error signal TE–PP obtained from equation (10), the lens moving signal level is removed from the push-pull signal level. As a result, the tracking error signal TE–PP results in a stable tracking error signal without an offset.

Additionally, in the differential phase detection method, the tracking error signal TE is computed using, for example, the following equation:

$$TE-DPD=\phi(a+c+e+g+i+k)-\phi(b+d+f+h+j+l) \tag{11}$$

where the operator $\phi$ denotes a signal phase.

It is noted that the tracking error signal TE is expressed as the tracking error signal TE–DPD to indicate that the tracking error signal TE is computed by the differential phase detection method.

Additionally, the spherical aberration signal computing circuit 23 can compute a second focus error signal FE2 (a focus error signal FE2 at the periphery of the light spot 51 shown in FIG. 7 or 8) according to, for example, the following equation:

$$FE2=(a+c+e+g)-(b+d+f+h). \tag{12}$$

Furthermore, the spherical aberration signal computing circuit 23 can compute a third focus error signal FE3 (a focus error signal FE3 at the inner periphery of the light spot 51) according to, for example, the following equation:

$$FE3=(i+k)-(j+l). \tag{13}$$

Then, the spherical aberration signal computing circuit 23 assigns these two focus error signals FE2 and FE3 to the right part of the following equation (14) to obtain a spherical aberration signal SA:

$$SA = FE2 - \beta*(FE3) \quad (14)$$

where β denotes a coefficient.

When the spherical aberration of a light beam emitted onto the optical disk 31 is small and is in focus, the intensity of the light spot 51 formed on the receiving surface of the light detecting unit 9 is substantially uniform over the entire spot. Accordingly, as can be seen from equations (12) to (14), the two focus error signals FE2 and FE3 are substantially zero. As a result, the intensity of the spherical aberration signal SA is substantially zero.

In contrast, when spherical aberration is introduced in the light beam emitted onto the optical disk 31, different light intensity distributions are generated in the inner periphery and the outer periphery of the light spot 51 formed on the receiving surface of the light detecting unit 9. Consequently, the values of the two focus error signals FE2 and FE3 are different. As a result, the spherical aberration signal SA has a certain value other than zero. Using the spherical aberration signal SA having this non-zero value, the spherical aberration can be detected.

Alternatively, the two focus error signals FE2 and FE3 can be computed using the following equations:

$$FE2 = (e+g) - (f+h), \text{ and} \quad (15)$$

$$FE3 = (a+i+k+c) - (b+j+d+l)] \quad (16)$$

Furthermore, as shown in FIGS. 6 to 8, FIG. 9, and FIG. 10, when the light receiving surface of the light detecting unit 9 is divided into the twelve light detecting portions AA to DL, the reproduction signal circuit 24 computes the sum of the output levels a to l of the corresponding light detecting portions AA to DL so as to generate a reproduction signal and output the generated reproduction signal.

By using the light detecting unit according to one of the above-described embodiments of the present invention, namely, the light detecting unit (pickup unit) having eight or twelve light detecting portions obtained by dividing the light receiving surface thereof and by using an optical disk apparatus including the light detecting unit, the following first to third advantages can be provided at the very least:

Firstly, since a tracking error signal that cannot be detected using the one spot push-pull method can be detected by using the differential phase detection (DPD) method, an optical disk apparatus can support a plurality of types of an optical disk using a single light detecting unit.

Secondly, since a single light detecting unit can detect a focus error signal with little crosstalk of a push-pull signal as well as a spherical aberration signal, the functionality of an optical pickup unit can be easily increased.

Thirdly, since the deterioration of a reproduction signal can be reduced even when the surface of a light detecting unit is divided into a plurality of areas, a whole reproduction signal can be detected using a single beam for detecting the reproduction signal without the need to divide the beam. Consequently, even when an optical disk including two or more signal layers is played back, deterioration of a servo error signal and the reproduction signal can be minimized.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disk apparatus comprising:
    a light emitting unit configured to emit a single light beam onto an optical disk;
    a light detecting unit including at least three light detecting portions each configured to receive light reflected off the optical disk and produce corresponding output, the at least three light detecting portions being arranged in a track direction of the optical disk;
    a tracking error signal generating unit configured to generate at least two types of the tracking error signal using the outputs from the at least three light detecting portions; and
    a tracking control unit configured to perform tracking control on the optical disk on the basis of the tracking error signal.

2. The optical disk apparatus according to claim 1, wherein said tracking error signal generating unit configured to generate a tracking error signal detecting power of the outputs from the at least three light detecting portions.

3. The optical disk apparatus according to claim 1, wherein said a tracking error signal generating unit configured to generate a tracking error signal detecting phase of the outputs from the at least three light detecting portions.

4. The optical disk apparatus according to claim 1, wherein said a tracking error signal generating unit configured to generate a first tracking error signal detecting power of the outputs from the at least three light detecting portions and a second tracking error signal detecting phase of the outputs from the at least three light detecting portions.

5. The optical disk apparatus according to claim 1, further comprising:
    a focus error signal generating unit configured to generate a focus error signal by performing computation according to an astigmatism method using the outputs from the at least three light detecting portions; and
    a focus control unit configured to control focus on the optical disk using the focus error signal.

6. The optical disk apparatus according to claim 1, further comprising:
    a first focus error computing unit configured to perform a predetermined computation using the outputs from at least two of light detecting portions of the light detecting unit so as to obtain a first focus error;
    a second focus error computing unit configured to perform a predetermined computation using the output from at least one of light detecting portion of the light detecting unit so as to obtain a second focus error;
    a spherical aberration signal generating unit configured to perform a predetermined computation using the first focus error and the second focus error so as to generate a spherical aberration signal; and
    a spherical aberration correcting unit configured to correct spherical aberration on the basis of the spherical aberration signal.

7. The optical disk apparatus according to claim 1, further comprising:
    a reproduction signal generating unit configured to perform a predetermined computation using the outputs from all of the light detecting portions of the light detecting unit so as to generate a reproduction signal, each of the light detecting portions being provided with a photodiode;
    wherein a cathode of the photodiode is connected to one of the tracking error signal generating unit and the reproduction signal generating unit, and an anode of the photodiode is connected to the other of the tracking error signal generating unit and the reproduction signal generating unit.

8. The optical disk apparatus according to claim 1, wherein, when one of the at least three light detecting portions at one end in the track direction is defined as a first light detecting portion and when the middle light detecting portion in the track direction is defined as a second light detecting portion, and when one of the at least three light detecting portions at the other end in the track direction is defined as a third light detecting portion, each of the first and third light detecting portions is divided into two in the track direction and the second light detecting portion is divided into two in the track direction and is divided into at least two in a direction perpendicular to the track direction.

9. The optical disk apparatus according to claim 8, wherein said a tracking error signal generating unit includes a first computing unit configured to perform a predetermined computation using output from the second light detecting portion and a second computing unit configured to perform a predetermined computation using output from the first and third light detecting portions so as to generate a tracking error signal on the basis of the computation results from the first and second computing units.

10. The optical disk apparatus according to claim 9, wherein the first computing unit computes a difference between a first computation result obtained by summing the outputs from at least two light detecting portions on one side in the track direction and a second computation result obtained by summing the outputs from at least two light detecting portions on the other side in the track direction; and
wherein the second computing unit computes a difference between the outputs from the two divided portions of the first light detecting portion in the track direction and computes a difference between the outputs from the two divided portions of the third light detecting portion in the track direction.

11. The optical disk apparatus according to claim 8, wherein said a tracking error signal generating unit includes a third computing unit configured to perform computation according to a differential phase detection method using the outputs from the first, second, and third light detecting portions so as to generate the tracking error signal on the basis of the computation result from the third computing unit.

12. The optical disk apparatus according to claim 11, wherein the third computing unit computes a difference between a first computation result and a second computation result, the first computation result being a sum of the outputs from the light detecting portions located on one diagonal line of the light detecting unit, and the second computation result being a sum of the outputs from the light detecting portions located on the other diagonal line of the light detecting unit.

13. The optical disk apparatus according to claim 8, wherein each of the divided light detecting portions of the second light detecting portion is further divided into an inner light detecting portion and an outer light detecting portion.

14. The optical disk apparatus according to claim 13, wherein each of the inner light detecting portions of the second light detecting portion has an L shape and one of the ends of the L-shaped inner light detecting portion is located at the outer periphery of the light detecting portion of the light detecting unit.

15. An optical pickup unit for use in an optical disk apparatus, comprising:
a light emitting unit configured to emit a single light beam onto an optical disk;
a light detecting unit including at least three light detecting portions each configured to receive light reflected off the optical disk and produce corresponding output, the at least three light detecting portions being arranged in a track direction of the optical disk; and
an output unit configured to output a signal from the at least three light detecting portions for generating at least two types of the tracking error.

16. The optical pickup unit according to claim 15, wherein, when one of the at least three light detecting portions at one end in the track direction is defined as a first light detecting portion and when the middle light detecting portion in the track direction is defined as a second light detecting portion, and when one of the at least three light detecting portions at the other end in the track direction is defined as a third light detecting portion, each of the first and third light detecting portions is divided into two in the track direction and the second light detecting portion is divided into two in the track direction and is divided into at least two in a direction perpendicular to the track direction.

17. The optical pickup unit according to claim 16, wherein each of the divided light detecting portions of the second light detecting portion is further divided into an inner light detecting portion and an outer light detecting portion.

* * * * *